Patented Apr. 1, 1941

2,237,221

UNITED STATES PATENT OFFICE 2,237,221

APPLICATION OF CELLULOSE DERIVATIVES

Vincent Jerome Flynn, Brooklyn, N. Y., assignor to Wardlyn Corporation, Union City, N. J., a corporation of New Jersey No Drawing. Application September 29, 1938, Serial No. 232,409

7 Claims. (Cl. 128—349)

This invention relates to compositions of tubes of varying size, shape and length partially or wholly composed of organic derivatives, either solid or hollow, or circular, oval, elliptical, square, rectangular or other cross-sectional shape, and in general, to surgical devices comprehended under the terms exploratory and evacuative, as catheters, sounds or cannulae, being when solid, intended for distending a passage, and when hollow for insertion into a normal opening of the body for injection or withdrawal of fluids therein or therefrom and for medicamentation, or for insertion into an incision as in post-operative work, for drainage and other purposes.

By the term "catheter" as herein applied, is to be understood as comprehending the various sizes, shapes and lengths of (usually) hollow construction for introduction of a substance into the body through an opening or the withdrawal of fluids therefrom, and referred to under terms such as antrum, colonic, elbowed, double-elbowed, curved, eustachian, faucial, female, indwelling, prostatic, or winged catheters, tubes, irrigators, and by other names.

Heretofore, catheters have been made of various materials showing a degree of flexibility, as thin metal tubing, rubber of varying stages of vulcanization, and compounds in the liquid or semi-liquid condition built up over a web as of a fabric, usually by repeated dipping of the same in a solution of the coating or impregnating material.

Metal catheters are harsh to delicate membranes, prone to irritate and wound tissues upon insertion, especially when the tissues are ultra-sensitive and unusually delicate, as in inflammatory and certain pathological processes and normal and pathological secretions exert a solvent effect on the metal which with some metals is very marked. Their comparatively low elasticity is also a disadvantage to their extensive application, especially in urological work as urethral, ureteral and renal exploration and in connection with the removal of some forms of renal calculi.

Catheters made of rubber vary greatly in elasticity and suppleness dependent upon the degree of vulcanization to which the rubber has been subjected. The "soft" rubber catheters are highly elastic, but more or less porous and spongy, causing difficulty in sterilization, and requiring such rigid sterilization treatments as to materially shorten their period of effectiveness. They also, in general, lack the requisite rigidity coupled with the desired flexibility to penetrate body canals, especially the ureter where the canal diameter is relatively small and more or less tortuous, and which may be constricted or even substantially closed by means of abnormal or other conditions present therein.

The "hard" rubber catheters while they may be of the desired rigidity, are deficient in suppleness and pliability. The comparatively large amounts of sulfur and sulfur compounds contained therein, together with the vulcanization accelerators, many of which are nitrogen compounds of pronounced toxicity, materially militate against their effectiveness and narrow their range of safe applicability. Furthermore, hard rubber catheters are prone to injure and wound delicate membranes which are often extremely tender and susceptible due to irritations and inflammatory conditions so that the use of these catheters is materially limited, both as to scope of application and to the technique and experience of the manipulator. Catheters are often used by the layman, sometimes daily, as in prostatic enlargement and analogous complications, and the unyielding property of vulcanized rubber often initiates irritation, which, when continued, may and does lead to serious chronic results.

Glass catheters, while usually of smooth surface, have a very low elasticity and suppleness, and there is always present the grave danger of breakage or chipping off, especially where the glass wall is of relatively extreme thinness, as is sometimes the case. For this and other reasons, the use of glass catheters involves an element of danger, and in addition they have a limited and decreasing range of applicability.

Enamel catheters, that is, catheters made of glazed porcelain, are used to a limited extent. They are practically rigid with zero flexibility, of relatively rough interior due to the difficulties of interior glazing, and very fragile in the thin cell wall diameter as usually prepared. By virtue of this inherent rigidity enamel catheters are useless for adaptation to the varying contour of the canal into which they are intended to be inserted, and the rough interior introduces the danger of incomplete sterilization.

One of the objects of my invention is to overcome and minimize the herein enumerated and other disadvantages, while still conserving the points of desirability of these instruments as a class, as applied to the various uses for which they are normally intended, and I have found that most of the inherent objections are overcome where the catheter material is composed of an etherized cellulose, especially where the degree of etherification approaches the maximum.

By etherized cellulose as herein used, is to be understood commercially alkylated, arylated or aralkylated normal or modified cellulose, as highly etherified methyl-, ethyl-, propyl-, butyl-, or benzyl-cellulose, or mixtures of the same as examples.

For many purposes and depending upon the physical properties desired in the finished catheter, and its size, dimensions, wall thickness, etc., the desired elasticity, suppleness, flexibility, stability, and freedom from objectionable features for the purposes for which it is intended, I may use a single or a mixed cellulose ether or mixture of cellulose ethers, and where additional suppleness, elasticity, etc., is desired, suitable plasticizers, flexilizers, softeners, extensifiers or suppleness-inducing components may be incorporated with the cellulose ether in amount and of nature to impart the kind and degree of characteristics desired. The highly etherified ethylcelluloses and benzyl-celluloses have been found especially useful in this connection, on account of the number and amount of suitable plastifying components which may be harmoniously incorporated therewith to induce the specific properties required and the extent of the same desired.

The cellulose ethers, as a class, are insoluble in, and not detrimentally affected by ptyalin, pepsin, trypsin, oleopsin, steapsin, and other body enzymes and fluids, the products elaborated in the gall bladder, liver and kidney, both those that are normal to the healthy body and those formed under pathological conditions; they can be produced of a high degree of flexibility, and are not adversely affected by the usual antiseptics, disinfectants, bactericides, both those of metallic and non-metallic origin, usually applied for sterilization purposes.

As is well known, many of the normal or pathological body secretions either are distinctly acid in reaction as the hydrochloric acid in the gastric juice, the bile acids, uric acid and the like, while other secretions are of pronounced alkaline reaction. These chemically reactive bodies often aided by enzymic action, exert an appreciable dissolving and decomposing effect upon a catheter or instrument of analogous use, when made of rubber or a simple cellulose ester, especially where in some instances, the tubular surgical device is left in the body for an extended period as often is the case in drainage treatments. With the simple cellulose esters, as the nitrate or the acetate, a saponifying action results, whereby a decomposition of the cellulose ester takes place by a splitting off of acid radical.

As the culmination of a series of quantitative researches, the surprising and unobvious observations has been made, that cellulose ethers, and specifically the dissimilar or mixed etherified celluloses as alkyl-aralkylcelluloses of comparatively high degree of etherification are substantially insoluble in and unaffected by chemical and other components elaborated by or in the human body in health and disease.

This has been found to hold true to the maximum degree when ethylbenzylcellulose or ethylpropylcellulose is the etherified cellulose employed, and where the etherification has been allowed to proceed to commercially maximum etherification, that is to say, where etherification of the cellulose has resulted in the introduction of ethylbenzyl, ethylpropyl, etc., rests to the extent of 75% to 95% of that theoretically possible, with the production of a cellulose ether substantially insoluble in water. In the use of dissimilar radical etherified celluloses as herein comprehended, in general it has been found that the porosity of the plasticized and extruded material is less and the solubility in normal and pathological body fluids lower, where the higher molecular weight radical preponderates in comparison to the lower molecular weight radical. That is, assuming cellulose in its simplest form as admitting of a tri-derivative being formed and that ethyl and benzyl are the two groups to be combined therewith, then better results have been obtained by me by the use of a monoethyl-dibenzylcellulose, for example, than with a diethyl-monobenzylcellulose, or product approximating in composition thereto. Similarly, if an ethyl-propylcellulose is to be employed for catheter formation according to this invention, I prefer to make use of a product which more nearly approximates a monoethyl-dipropylcellulose, than where the ethyl predominates. The word "maximum" as herein used in connection with the etherification of cellulose or other carbohydrate, varies considerably in commercial processes, depending upon the nature of the etherifying process and the efficiency of the particular apparatus employed in the various etherifying steps.

The available mixed poly-ethers of cellulose, such as ethylbenzylcellulose, are not of maximum commercial degree of etherification. They are etherified enough to meet most of the technical requirements for which they are intended, but in order to prepare a mixed etherified cellulose the process becomes more costly and this expense is not justified by the usual requirements for cellulose ethers in the lacquer and plastics arts.

It is generally recognized that the water-insolubility, swelling-resistance in the presence of water or other hydrous substances, and innocuousness to chemical reagents, all gradually increase in direct relation to the proportion of ether substituents in the cellulose aggregate, but heretofore no quantitative work has been done in determining the relative insolubility and innocuousness in normal and pathological fluids of alkyl-aralkylated celluloses approaching the theoretical maximum in degree of etherification. In using an instrument of the catheter type, and in drainage after operations, especially in the treatment of renal calculi and in renal surgery, often it becomes necessary to allow the instrument to remain partially within the body for several days in contact with highly sensitive membranes. Under such circumstances, it becomes of prime importance to have a catheter which will undergo substantially no swelling while in contact with the normal and pathological body fluids which may be in and around it.

Because of the intumescing and solubilizing action of the acid and alkaline body contents on the usual and commercial mixed cellulose ethers, they are unsuitable for the purpose intended in this invention. Where, heretofore, the mixed cellulose ethers have been found unsatisfactory in this field due to the limitations above outlined, I have overcome these difficulties by either etherifying cellulose with a theoretical excess of mixed etherifying agents under optimum conditions, or by further etherifying a cellulose ether with a dissimilar etherifying agent, such that the final etherified cellulose has been etherified to substantially the maximum.

Another discovery made by me is that in cases where the maximum amounts of etherifying groups are combined with the cellulose aggregate, it is possible to add thermoplasticizers to the catheter substance so that the softening point of the completed catheter or surgical instrument, if desired, may be reduced to about the normal temperature of the human body. Thus the rigidity of the instrument may be modified by insertion in the body. In this way, these catheters are suitable for exploratory work, especially in connection with renal treatment and examinations, a usage which would be difficult if not impossible with a rigid and non-thermoplastic body (as rubber).

The cellulose ethers of dissimilar radicals, as a body are characterized by relatively great stability and apathy to reaction with chemical reagents, while still conserving an unusually high degree of inherent flexibility. The cellulose ethers may be treated with lye solutions of high concentration with impunity, since there is no acid radical to saponify off by alkaline treatment as is the case with the simple cellulose esters, and in addition are inert to many chemicals which injuriously affect rubber and other materials of which catheters of the present art are made. It is impossible to increase the elasticity of rubber at will by the addition of products thereto, whereas with the cellulose ethers, by selection of the appropriate plastifying agent or combination of the same, and the ratio between plastifier and cellulose ether, there is a very wide range of flexibility and elasticity possible, which peculiarly adapts the cellulose ethers for use in the catheter industry. Phenols, iodides and other halogen inorganic or organic compound of normal bactericidal concentration are inert in unfavorable action to the cellulose ethers of degree of etherification comprehended herein.

The antiseptic, local anesthetic, fungicide, bactericide, medicament, or other addition of therapeutic value to the catheter substance may be incorporated therewith in any approved manner, such, for instance, as dissolving the same in a relatively small amount of harmonious solvent or solvent combination, incorporating the same with the etherized cellulose in any approved manner as by malaxation, then preferably removing the volatile portion by an evaporative step before extrusion, so that the medicament is uniformly disseminated throughout the etherized cellulose mass.

The etherized celluloses as a class are peculiarly adapted for use in this connection by virtue of the fact that they may be extruded in practically non-porous condition, may be dyed, pigmented, or otherwise treated without detrimentally affecting their normal stability or usefulness; and the elasticity, being inherent in the cellulose ether body, persists unchanged for an indefinite period of time. Therefore, a widely varying degree of desirable properties may be obtained, especially as to elasticity, plasticity, suppleness and flexibility of the ether, and these inherent desirable properties may be considerably enhanced by the addition to the cellulose ethers of suitable plasticizing bodies now known to the cellulose ether art, such as aliphatic and carbocyclic esters of lactic, glycollic, tartaric, phthalic and other acids, aryl phosphates, cyclohexanol esters, synthetic resinous bodies such as the halogenated diphenyls, the substituted sulfonamides, and the like.

A catheter, in general, may be considered as a tube, straight, curved, elbowed, etc., depending upon the use for which it is normally intended, and usually comprises an outer end or end held by the operator, which may be of the same exterior diameter as the remainder of the tube portion or may be flared or otherwise enlarged; the opposite end called the tip or beak, being that end intended for insertion, and which may be of the same diameter as the tube portion, or may be smaller, and is usually made in many shapes and in a variety of ways. The tip may be a portion of the original tube with one or more orifices therein, or it may be a separate piece immovably attached to the body of the catheter tube by means of an agglutinant, by fusion, or in any other manner. The shape, configuration, length, and number of orifices therein, may vary considerably, depending upon the specific use to which the instrument is to be applied.

Having determined the degree of ether properties intended from the desired use for which the instrument is designed, the kind and nature of mixed cellulose ether is selected, the amount and kind of thermoplasticizing body added if any be used, and the composition by means of solvents, non-solvents and solvent and non-solvent combinations, gelatinized or colloided to the degree required, then extruded through an orifice of appropriate size and shape, into tubular or other form.

In general, it has been found the melting point is raised and the deleterious action of water on the mixed cellulose ether decreases with the number of dissimilar radicals in the etherized cellulose, and increase in molecular weight of the same. For the above and other reasons, I have obtained most satisfactory results herein by employing a cellulose ether or cellulose ethers approaching substantially as nearly as commercially feasible, the maximum in etherification.

The exterior surface of the material may be modified as by smoothing, dipping in a cellulose ester, cellulose ether, or other lacquer or coating composition, to increase the hardness, lessen the degree of permeability or for other reasons, after which the tube portion is expanded or the diameter otherwise modified at the outer end, and the tip or beak portion may be punched, drilled, or otherwise one or more orifices placed therein after closing the beak end, as with a cellulose ether composition, or a separate tip may be made and coapted onto the tube portion by means of an adhesive, by heat, by heat and pressure, or in any other way, said tip being of the size and nature required for the specific purpose intended. The number, size, spacing and location of orifices in the beak portion may be modified at will.

The cellulose ether composition may be colored, with dye or pigment or both, to render the instrument distinctive upon observation; it may be printed or lithographed upon, either under or on the final exterior coat if the extruded member is subjected to a dipping process after extrusion, or various antiseptics, remedial agents, analgesics or local anesthetics may be incorporated in the cellulose ether plastic mass to induce a therapeutic effect on the organs with which the catheter may normally be brought into contact. Urethral and especially ureteral catheter explorations are usually relatively painful operations, so that the incorporation within the catheter mass of local anesthetics, analgesics and the like, is often indicated.

Before extrusion into tubular form, and especially where the instrument is intended primarily for urological work as with urethral and ureteral catheters, the cellulose ether may have incorporated therewith and therein, varying proportions of opacity inducing bodies of value in X-ray work, such as bismuth salts (the normal nitrate or subnitrate), lead sulfates and lead salts, barium salts such as barium sulfate or barium titanate and other salts or mixtures of salts suitable for this purpose. As an example, given for illustrative purposes only, I have found an excellent composition for this purpose to be composed of 100 parts cellulose ether plastic mass to about 100 to 150 parts lead sulfate, although these proportions may be varied, from the amounts above stated, depending upon the cellulose ether composition, the dimensions and thickness of the catheter tube, the nature of the opacity-inducing body used, and the particular roentgenological diagnosis to be made.

Urethral catheters are usually flared on the outer end, substantially round, of exterior diameter 0.06 to 0.25 inch, interior diameter sufficiently large usually to admit a ureteral catheter. Ureteral catheters are usually not flared on the outer end, and vary in tube diameter from 0.04 to 0.10 inch external and about 0.015 inch internal diameters. For colonic work, a round tip is usually used, the exterior diameter being up to 0.75 inch diameter. An antrum catheter usually has an exterior diameter range of 0.075 to 0.15 inch and a varying internal diameter. The exterior and interior diameters will, of course, be adjusted by the extrusion operation, taking into the consideration the amount, if any, of volatile solvent present and the relative volatility of the plasticizing portion added to the mixed cellulose ether prior to the extrusion operation. The shape of the catheter tip may vary considerably, as in the olive, round or whistle tips, as examples.

In general, the substantially maximum alkyl-aralkylated celluloses have a relatively high inherent thermoplasticity, which property may be considerably augmented and varied in degree by the incorporation therewith of suitable known cellulose ether plasticizers and flexibility-inducing compounds, and still conserve the relatively high and permanent stability to, and insolubility in chemical reagents which characterize the cellulose ethers in general.

Likewise, it has been found that by the use of certain cellulose ether plasticizing and thermoplasticizing agents, the stability of the etherized cellulose may be augmented, the porosity diminished, and the suppleness and flexibility materially increased, without concomitantly decreasing otherwise valuable inherent characteristics.

There has been described a method of producing a catheter by first forming a textile core, dipping the core into a solution of cellulose or other compound, drying the same, then repeating the process until there has been built up on the textile center or core a sufficient thickness of layers for the purposes intended. However, such constructed tubes are porous, they have pinholes and blisters therein which increase the natural porosity, as compared with the cellulose ether composition of the nature as herein set forth which has been compacted by the necessarily high pressure involved in the extrusion operation to a unitary non-porous whole, and is composed of a unitary material throughout its substance. With a fabric core catheter built up in manner as above indicated, there is tendency upon use for the textile core to become frayed, and a fragment may be broken off and remain in the bladder or kidney, thus providing a nucleus or nidus around which a calculus may form.

Therefore, the catheter involved in this invention is of homogeneous structure throughout, and there is no dissimilar material core which may break off, fray or cause an impediment in X-ray work or similar investigation, on account of variation of opacity.

At the close of the extrusion operation, the catheter may be dipped, sprayed, or otherwise coated with a cellulose compound in solution, and the instrument may be smoothed, polished, printed upon or otherwise treated to produce a finished appearing instrument. The printing operation may be conducted upon the extruded cellulose compound, either before or after the catheter is coated with a fluid compound, and either before or after the polishing or other finishing operation.

What I claim is:

1. A tubular surgical device comprising a water-insoluble etherized cellulose containing dissimilar rests and of maximum degree of etherification.

2. A tubular surgical device comprising a water-insoluble alkyl-aralkylated cellulose of maximum alkyl-aralkylation.

3. A flexible, tubular surgical device of homogeneous structure, said device comprising a thermoplastic alkyl-aralkylated cellulose of substantially maximum degree of alkyl-aralkylation.

4. An instrument for withdrawal of fluids from the body comprising a water-insoluble alkyl-aralkylated cellulose of substantially maximum alkyl-aralkylation.

5. A catheter comprising a substantially wholly ethyl-benzylated ethylbenzyl-cellulose containing plasticizer.

6. A smooth, water-insoluble catheter comprising an ethylated-benzylated cellulose of commercially maximum degree of alkyl-aralkylation in which the benzyl predominates.

7. A catheter comprising a relatively long, hollow tube of small external diameter formed by extrusion from a thermoplastic mass of alkyl-aralkylated cellulose so as to be externally smooth, continuous, non-porous and highly flexible but having sufficient inherent tensile strength and longitudinal rigidity to permit insertion by itself into and through long, narrow and tortuous bodily passages, the degree of alkyl-aralkylation of said mass being so high as to render said catheter water-insoluble and unaffected by moisture, substantially inert to bodily fluids and medicaments and to have the other inherent characteristics aforesaid.

VINCENT JEROME FLYNN.